United States Patent [19]

Harwood et al.

[11] Patent Number: 4,651,196
[45] Date of Patent: Mar. 17, 1987

[54] ADAPTIVE CONTROL OF THE CHROMINANCE SIGNAL FREQUENCY RESPONSE IN A VIDEO SIGNAL PROCESSING SYSTEM

[75] Inventors: Leopold A. Harwood, Bridgewater; Chandrakant B. Patel, Hopewell, both of N.J.

[73] Assignee: RCA Corporation, Princeton, N.J.

[21] Appl. No.: 713,753

[22] Filed: Mar. 19, 1985

[51] Int. Cl.$^4$ .................... H04N 9/64; H04N 9/77
[52] U.S. Cl. ........................ 358/38; 358/31; 358/40
[58] Field of Search ............... 358/31, 36, 38, 40

[56] References Cited

U.S. PATENT DOCUMENTS

| | | | |
|---|---|---|---|
| 4,050,084 | 9/1977 | Rossi | 358/31 |
| 4,074,321 | 2/1978 | Miller | 358/31 |
| 4,143,397 | 3/1979 | Holmes | 358/31 |
| 4,149,181 | 4/1979 | Burdick et al. | 358/31 |
| 4,167,021 | 9/1979 | Holmes | 358/36 |
| 4,179,705 | 12/1979 | Faroudja | 358/31 |
| 4,240,105 | 12/1980 | Faroudja | 358/31 |
| 4,389,665 | 6/1983 | Nagao et al. | 358/23 |
| 4,443,817 | 4/1984 | Faroudja | 358/167 |
| 4,472,733 | 9/1984 | Bolger | 358/38 |

Primary Examiner—Michael A. Masinick
Assistant Examiner—Robert Michael Bauer
Attorney, Agent, or Firm—E. M. Whitacre; P. J. Rasmussen; K. N. Nigon

[57] ABSTRACT

A digital television receiver, which uses a comb filter to separate the luminance and chrominance components of composite video signals, includes an adaptive band-pass filter for processing the comb filtered chrominance signals. Comb filtered chrominance signals may include luminance vertical detail information at the relatively high frequencies also occupied by chrominance information. The adaptive band-pass filter is controlled to have a narrow bandwidth when significant amounts of this relatively high frequency vertical detail information are present and to have a wide bandwidth otherwise. Consequently, the bandwidth of the chrominance signal provided by this filter is restricted only when it is necessary to prevent distortion, and vertical detail is added to the luminance signal only when it is not likely to be contaminated with chrominance information.

8 Claims, 6 Drawing Figures

ADAPTIVE CONTROL OF THE CHROMINANCE SIGNAL FREQUENCY RESPONSE IN A VIDEO SIGNAL PROCESSING SYSTEM

The present invention relates to a filter having an adaptive frequency response characteristic for use in the chrominance signal processing circuitry of a video signal processing system which includes a comb filter.

The luminance and chrominance component signals of NTSC and PAL composite video signals have overlapping frequency spectra, which are disposed in a frequency interleaved relation. For example, in the NTSC system, luminance components occupy a band of frequencies ranging from approximately 0 Hz to 4.2 MHz and the chrominance components occupy a band of frequencies ranging from approximately 2.1 MHz to 4.2 MHz. The luminance components of the NTSC signal are generally at integral multiples of the horizontal line scanning frequency ($f_H$) and the chrominance components are generally at odd multiples of one-half of the line scanning frequency ($\frac{1}{2}f_H$).

Comb filter arrangements are known which separate the frequency interleaved luminance and chrominance components of the video signal. Where a comb filter is employed, however, reproduction of a color image tends to be impaired by the presence of relatively low frequency luminance signal components in the comb filtered chrominance signal and by the absence of these components in the comb filtered luminance signals.

This relatively low frequency luminance information is commonly referred to as vertical detail. Vertical detail signals may be produced, for example, for an image containing diagonal lines. The absence of vertical detail information in the comb filtered luminance signal tends to reduce the vertical resolution of these diagonal lines, and its presence in the comb filtered chrominance signal tends to distort the colors of the reproduced image. Although the frequency spectrum of the vertical detail signal is the same as that of the luminance signal, high frequency vertical detail information (e.g. above 2.5 MHz for NTSC) is statistically insignificant in broadcast signals.

Conventional television receivers apply the comb filtered chrominance signal to a low-pass filter which may, for example, have a pass-band from 0 to 1 MHz to extract some of the vertical detail information. The signal provided by this filter is added to the comb filtered luminance signal and subtracted from the comb filtered chrominance signal. This process restores the low frequency vertical detail components to the luminance signals and removes some of the contaminating components from the chrominance signals.

This process does not completely correct either the luminance or chrominance signals, however. Vertical detail signals having frequencies greater than 1 MHz may still contaminate the chrominance signal causing color distortion and limiting the resolution of diagonal lines in the image. If the bandwidth of the vertical detail filter is increased to reduce this distortion, spurious dots may appear at the edges of image areas containing relatively saturated colors. These dots are cross-color interference produced by relatively high frequency chrominance signals that have sufficient amplitude to pass through the vertical detail low-pass filter.

The visibility of these defects may be reduced by including an adaptive vertical detail filter in the system. A filter of this type changes between having a relatively narrow bandwidth and a relatively wide bandwidth when composite video signals containing relatively low or high amplitude chrominance signals, respectively, are processed.

Although an adaptive filter system of this type improves the resolution of the image by recovering more of the vertical detail signal, it does not reduce the chrominance signal distortion which may be caused by relatively large amplitude, relatively high frequency vertical detail signals. This problem is most acute in NTSC video signal processing systems which process full bandwidth I color difference signals, since high frequency vertical detail signals may have frequencies which overlap the frequency bands occupied by the modulated high frequency I signal components. The distortion caused by this overlap may appear as color fringing on the diagonal edges of some displayed objects. For example, if relatively small green letters are displayed on a white background, the distortion may cause some of the letters (e.g. A, K, R) to appear to have red dots along their diagonal edges.

SUMMARY OF THE INVENTION

The present invention is a chrominance band-pass filter which has a variable bandwidth. The filter is used in a video signal processing system, which includes a comb filter for separating the luminance and chrominance components from a composite video signal. The comb filtered chrominance signals are applied to a fixed band-pass filter which extracts relatively high frequency luminance vertical detail information. This vertical detail information is applied to circuitry which generates a control signal to change the bandwidth of an adaptive chrominance band-pass filter. The control signal reduces the bandwidth of the adaptive filter as the amplitude of the relatively high frequency vertical detail signals increases and increases the bandwidth of the adaptive filter as the amplitude of these signals decreases.

DETAILED DESCRIPTION

Figure 1:
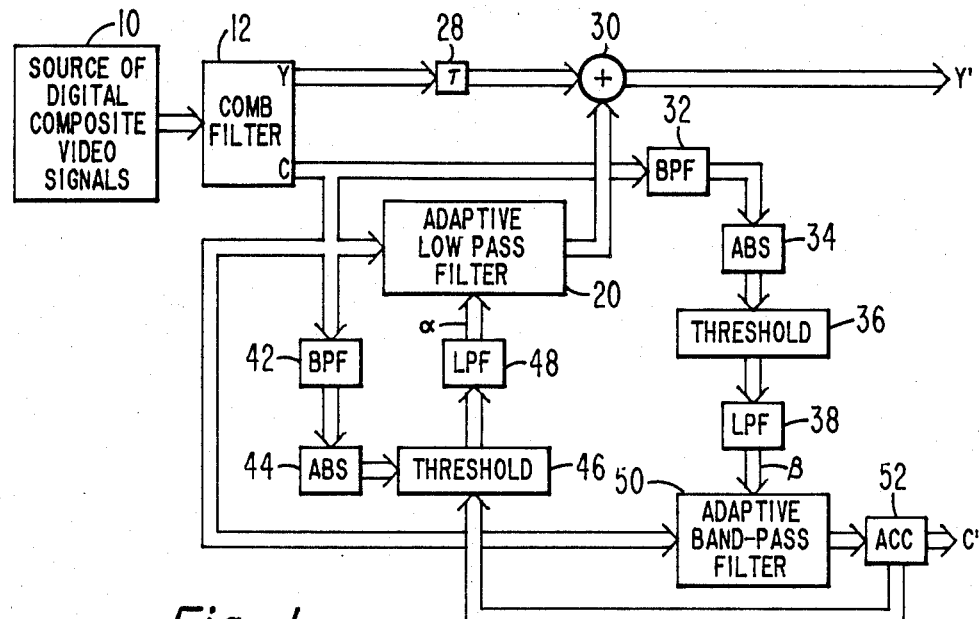
FIG. 1 is a block diagram of a luminance/chrominance separation circuit including an adaptive band-pass chrominance signal filtering system embodying the present invention.

In the drawings, broad arrows represent busses for multiple-bit parallel digital signals. Line arrows represent connections carrying analog signals or single bit digital signals. Depending on the processing speed of the devices, compensating delays may be required in certain of the signal paths. One skilled in the art of digital circuit design would know where such delays would be needed in his particular system.

In FIG. 1, a source of composite video signals 10, which may include the tuner, intermediate frequency amplifier and video detector of a conventional digital color television receiver, provides digital composite video samples at a rate substantially equal, for example, to four times the color subcarrier frequency ($4f_{sc}$) to comb filter 12.

Comb filter 12, which may be a conventional 1H comb filter, provides luminance and chrominance samples at its output ports Y and C respectively. As set forth above, the comb filtered chrominance samples may include some relatively low frequency luminance information, having frequencies substantially equal to odd harmonics of $\frac{1}{2}f_H$, hereinafter referred to as vertical detail information.

The chrominance samples from comb filter 12 are applied to the adaptive low-pass filter 20, which separates some of the vertical detail signal from the comb filtered chrominance signal. Filter 20 has a variable bandwidth, which is controlled by the instantaneous magnitude of the relatively high frequency components of the chrominance signal portion of the comb filtered chrominance signal.

Comb filtered chrominance samples from filter 12 are applied to the input port of band-pass filter 42. An exemplary frequency response characteristic for filter 42 is shown by curve 440 of FIG. 4B. Only chrominance samples within a relatively narrow band of frequencies centered about $\frac{3}{8}f_{sc}$ are passed by this filter. This band of frequencies is above the band of frequencies which may be occupied by the statistically significant vertical detail signals and below the band of frequencies occupied by the narrow bandwidth chrominance signals. Thus, the signals provided by the band-pass filter 42 are substantially the relatively high frequency components of the modulated I color difference signal. Filter 42 applies this signal to the absolute value circuit 44 which changes the polarity of selected samples to provide samples having one polarity to threshold circuit 46. Circuit 46 may be, for example, a coring circuit which passes only those samples having values which exceed a threshold value, substituting zero valued samples for those samples which do not exceed the threshold value. In the present embodiment, the magnitude of this threshold value is controlled by a chrominance magnitude signal provided to the threshold circuit 46 by the automatic chrominance control (ACC) circuitry 52, described below. For large magnitude chrominance signals, the threshold is higher than for low magnitude signals. Details of the threshold circuit are not shown since it is not considered a part of the invention. A threshold circuit 46, which conforms to the specifications set forth above, may be built from conventional components by one skilled in the art.

The samples from threshold circuit 46 are applied to low-pass filter 48, which may, for example, have a pass-band from zero to 1.2 MHz. The signal provided by low-pass filter 48 has a relatively large amplitude when the comb filtered chrominance samples contain a significant amoiunt of relatively high frequency I color difference signal and has a relatively small amplitude otherwise. Low-pass filter 48 applies this signal as an attenuation factor, $\alpha$, to control the bandwidth of the adaptive low-pass filter 20.

Figure 2:
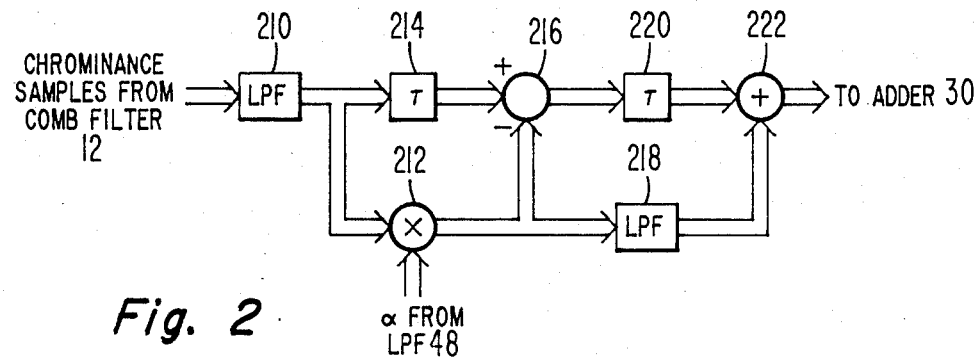
FIG. 2 is a block diagram of an adaptive low-pass filter suitable for use with the embodiment shown in FIG. 1.

FIG. 2 is a block diagram of an embodiment of the adaptive low-pass filter 20. Chrominance samples from comb filter 12 are applied to low-pass filter 210 which has a frequency response characteristic similar to curve 410 of FIG. 4A. The samples provided by low-pass filter 210 are applied to sample scaler 212. The sample scaler 212, which may, for example, be a conventional 16 bit digital multiplier such as AM29516 manufactured by Advanced Micro Devices, Inc., provides attenuated replicas of the samples applied to its multiplicand input port. The attentuation factor, $\alpha$, is provided by low-pass filter 48, as described above, and is applied to the multiplier input port of sample scaler 212. In the present embodiment, the samples from low-pass filter 210, which may be, for example, eight-bits wide, are applied as the eight most significant bits of the multiplicand input signal and the four most significant bits of the samples from low-pass filter 48 are applied as the four more significant bits of the eight least significant bits of the multiplier input signal. The output samples are available on lines 8 through 15 of the output bus of the sample scaler, where the lines that make up the output bus are numbered from 0 (least significant) to 31 (most significant).

Figure 5:
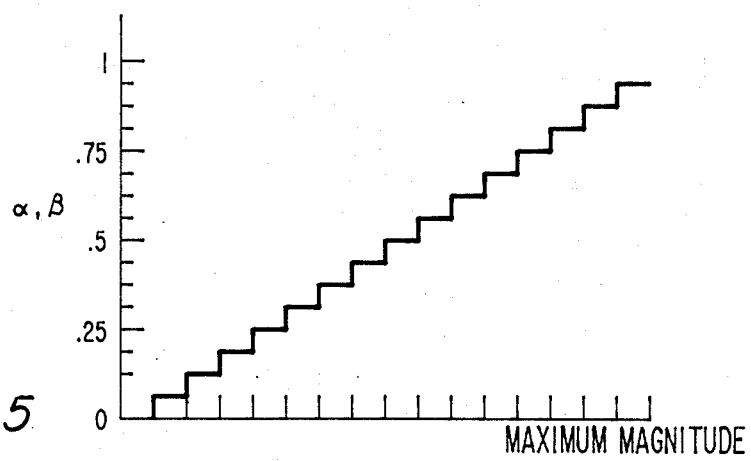
FIG. 5 is a graph of attenuation factor versus signal magnitude which is useful in explaining the operation of the embodiment shown in FIG. 1.

In this arrangement, the four bits applied to the multiplier input port of the sample scaler 212 by low-pass filter 48 represent the values 0 through 15/16. The correspondence between the magnitude of the band-pass filtered chrominance samples and the value of the attenuation factor is shown in FIG. 5. The horizontal axis represents the magnitude of the bandpass filtered chrominance samples. This axis is divided into sixteen parts, the leftmost part corresponding to chrominance magnitudes for which the four most significant bits, exclusive of the sign bit, are zeros and the rightmost part to magnitudes for which the four most significant bits, exclusive of the sign bit, are ones. The vertical axis represents the possible values of the attenuation factor. As shown by the graph, the attenuation factor is zero when the four most significant bits of the chrominance magnitude samples from low-pass filter 48 are zero and increases by 1/16 for each increase of 1 in the four most significant bits of the chrominance magnitude.

It is contemplated that the sample scaler 212 may be a programmable bit shifter (not shown), instead of a sixteen bit multiplier. In this alternative embodiment, the shifter is controlled by the output signal from low-pass filter 48. As the amplitude of the samples provided by low-pass filter 48 increases, the programmable bit shifter 212 shifts the samples provided by low-pass filter 210 into less significant bit positions. The samples provided by this sample scaler would be attenuated, for example, in steps of powers of one-half.

The attenuated samples from sample scaler 212 are applied to a second low-pass filter, 218. In the present embodiment, the frequency characteristics of filter 218 is shown by curve 412 of FIG. 4A. Since the pass-band of filter 218 is considerably narrower than the pass-band of filter 210, the samples which have been filtered by the cascade combination of filters 210 and 218 have the frequency spectrum of samples filtered by the low-pass filter 218 alone.

Attenuated samples from sample scaler 212 are also applied to the subtrahend input port of subtracter 216. Samples from low-pass filter 210 are coupled to the minuend input port of the subtracter 216 by delay element 214. Delay element 214 provides compensating delay substantially equal to the processing time through sample scaler 212. Subtracter 216 provides samples that are supplementary to the samples provided by sample scaler 212. In other words, if the samples provided by sample scaler 212 are represented by $\alpha X$, $\alpha$ being the attenuation factor, then the samples available at the output port of subtracter 216 may be represented by $(1-\alpha)X$.

The samples provided by subtracter 216 are delayed by delay element 220 and applied to an input port of adder 222. Samples from low-pass filter 218 are applied to the other input port of adder 222. Delay element 220 provides compensating delay equal to the processing delay through low-pass filter 218. Adder 222 produces samples representing the sum of a doubly filtered and attenuated signal and its singly filtered supplementary signal. The proportion of singly filtered signal to doubly filtered signal is determined by the level of attenuation applied by sample scaler 212. When the attenuation factor is close to unity, the filter system appears as a cascade combination of low-pass filters 210 and 218. The frequency characteristic of the filtering system in this state is shown by curve 412. When the attenuation factor approaches zero, however, the filtering system appears as filter 210 only, and has the frequency characteristic shown by curve 410. For attenuation factors between zero and unity, the frequency characteristic of the filter lies within the shaded region between curves 410 and 412.

Referring once more to FIG. 1, samples from adaptive filter 20 are applied to one input port of adder 30. The other input port of adder 30 is coupled to receive comb filtered luminance samples from filter 12 via delay element 28. The delay element 28 provides compensating delay substantially equal to the processing time through adaptive low-pass filter 20. Adder 30 restores the vertical detail information to the comb filtered luminance samples and provides these restored luminance samples via bus Y'. The restored luminance samples may be applied to a conventional luminance signal processor (not shown) where, for example, they may be filtered for attenuation of high frequency components and applied to a digital matrix (not shown) where they may be combined with appropriately processed color difference signal samples to produce samples representing the red, green and blue primary color signals. The primary color signals may be used to drive a display device (not shown).

Chrominance samples from comb filter 12 are applied to the signal input port of adaptive band-pass filter 50. A pass-band control signal for filter 50 is generated, from the chrominance samples provided by comb filter 12, by band-pass filter 32, absolute value circuit 34, threshold circuit 36 and low-pass filter 38.

Figure 4A:
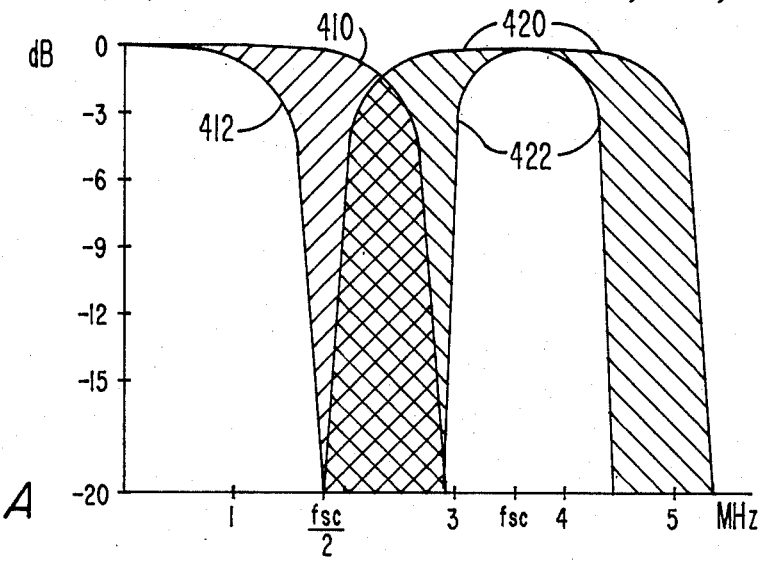
FIGS. 4A and 4B are graphs of signal amplitude versus frequency which illustrate frequency characteristics that are useful in explaining the operation of the embodiment shown in FIG. 1.
Figure 4B:
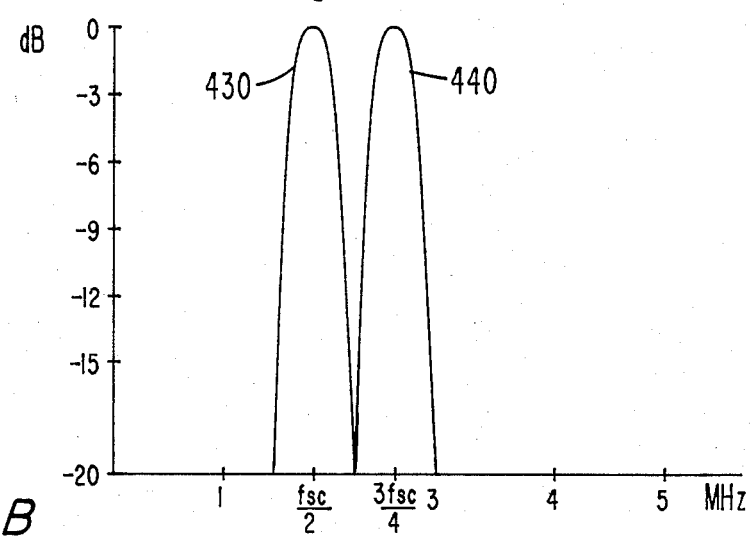

Band-pass filter 32, which may, for example, have a pass-band similar to curve 430 of FIG. 4B, passes the relatively high frequency components of the vertical detail signal to the absolute value circuit 34. The absolute value circuit 34 changes the polarity of selected samples to provide samples having only one polarity to threshold circuit 36. Threshold circuit 36 passes only those samples which have magnitudes greater than a predetermined threshold value to the low-pass filter 38. Filter 38, which, for example, has a bandwidth of 1.2 MHz develops a signal proportional to the instantaneous magnitude of the high frequency vertical detail signals which, in the NTSC system, may occupy the band of frequencies immediately below the band of frequencies occupied by the relatively high frequency components of the modulated I color difference signal. This signal provides an indication of the magnitude of the vertical detail signal components which may overlap the frequency band occupied by the modulated high frequency I color difference signal components. In the present embodiment, the four most significant bits of this indicating signal are applied as the attenuation factor $\beta$ to the bandwidth control signal input terminal of adaptive band-pass filter 50.

Figure 3:
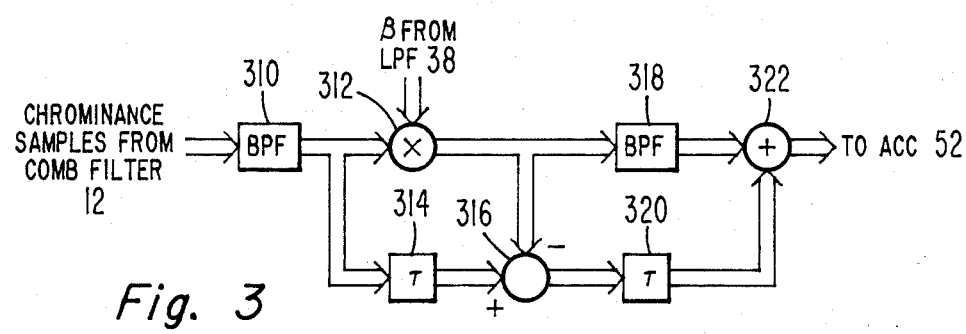
FIG. 3 is a block diagram of an adaptive band-pass filter suitable for use in the embodiment shown in FIG. 1.

FIG. 3 is a block diagram of a suitable embodiment of adaptive band-pass filter 50. Chrominance samples from comb filter 12 are applied to band-pass filter 310 which, in the present embodiment, has a frequency characteristic represented by curve 420 of FIG. 4A. Samples from band-pass filter 310 are applied to the multiplicand input port of sample scaler 312, the multiplier input of which is connected to the output port of low-pass filter 38. The sample scaler 312 may, for example, be a conventional 16 bit parallel multiplier. In the present embodiment, the samples from band-pass filter 310 which may, for example, be eight bits wide, are applied as the eight most significant bits of the multiplicand input signal and the four-bit samples from low-pass filter 38 are applied as the four more significant bits of the eight least significant bits of the multiplier input signal. The output samples are available on lines 8 through 5 of the output bus of multiplier 312, where the lines that make up the output bus are numbered from 0 (least significant) to 31 (most significant).

The attenuation factor, $\beta$, applied to the sample scaler 312 by low-pass filter 38 may range in value from 0 to 15/16. The correspondence between the amplitude of the signal developed by low-pass filter 38 and the value of the attenuation factor applied to the sample scaler 312 is shown in FIG. 5. In this instance, the horizontal axis of FIG. 5 represents the magnitude of the samples provided by low-pass filter 38 and the vertical axis represents values of the attenuation factor, $\beta$. As shown by the graph, the attenuation factor is zero when the four most significant bits of the samples provided by filter 38 are zero and increases by 1/16 for increase of 1 in the four most significant bits of this signal.

It is contemplated that the sample scaler 312 may alternatively be realized as a programmable bit shifter (not shown). In this alternative embodiment the sample scaler 312 shifts the samples provided by band-pass filter 310 into successively less significant bit positions as the amplitude of the signal from low-pass filter 38 increases.

Chrominance samples that have been scaled by the attenuation factor $\beta$ are applied to the subtrahend input port of subtracter 316. Samples from band-pass filter 310, delayed by delay element 314 to compensate for the processing time through sample scaler 312, are applied to the minuend input port of the subtracter 316. Subtracter 316 provides samples that are supplementary to the samples provided by sample scaler 312.

Samples from sample scaler 312 are applied to band-pass filter 318, which in the present embodiment has a frequency response characteristic represented by curve 422 of FIG. 4A. Filter 318 applies doubly filtered and attenuated samples to one input port of adder 322. The singly filtered supplementary samples from subtracter 316 are coupled by compensating delay element 320 to the other input port of adder 322. The samples provided by adder 322 are the sum of a doubly filtered and attenuated signal and its singly filtered supplementary signal. The proportion of singly filtered signal to doubly filtered signal is determined by the level of attenuation applied by sample scaler 312. When the attenuation factor is close to unity, the filtering system appears as the cascade combination of band-pass filters 310 and 318. Since the pass-band of filter 318 is significantly narrower than that of filter 310, the frequency characteristic of this combination is shown by the curve 422. As the attenuation factor approaches zero, the frequency response of the filter system approaches curve 420.

The signal provided by adder 322 is the output signal of the adaptive band-pass filter 50. This signal is applied to the ACC circuitry 52 which amplifies or attenuates the chrominance signal from filter 50 to keep the magnitude of the chrominance samples within a predetermined range of values. ACC 52 includes circuitry to develop a signal indicative of the average magnitude of the chrominance samples, circuitry to develop a gain factor signal from this magnitude signal and a predetermined nominal magnitude value, and circuitry to apply this gain factor to the chrominance samples provided by filter 50. ACC 52 provides these scaled chrominance samples via bus C', and provides the chrominance magnitude signal to threshold circuit 46 as described above.

ACC 52 is not shown in detail because it is not considerd a part of the present invention. ACC circuitry consistent with the description set forth above can be built from conventional components by one skilled in the art.

The chrominance samples available via bus C' may be applied to a conventional chrominance signal processor (not shown) where, for example, they may be demodulated into color difference signals. The color difference signals may be combined with appropriately processed luminance signals in a matrix (not shown) to produce the red, green and blue primary color signals used to drive a display device (not shown).

The adaptive filtering system described above narrows the bandwidth of the chrominance band-pass filter to remove distorting luminance vertical detail information from the comb filtered chrominance signal. This filter acts in concert with a similar adaptive low-pass filter which provides a vertical detail signal that is substantially free of distortion from the relatively high frequency components of the modulated chrominance signal. Each of the filters narrows the bandwidth of the signal it provides only when distortion from the other signal is likely. Otherwise, each filter provides a relatively wide bandwidth signal. The image produced when this adaptive filter system is used is relatively sharp and undistorted compared to the image produced by a system which uses non-adaptive filters.

What is claimed is:

1. In a video signal processing system including a source of a comb filtered chrominance signal, which includes a chrominance signal component occupying a first band of frequencies, and which may include a luminance signal component occupying a second band of frequencies which overlaps said first band of frequencies, apparatus comprising:
    adaptive filtering means, coupled to said source, for controllably attenuating the components of said comb filtered chrominance signal which occupy said second band of frequencies in response to a control signal;
    means, coupled to said source, for separating from said comb filtered chrominance signal, a portion of said luminance signal component which occupies a third band of frequencies having a bandwidth less than one-half of the bandwidth of said first band of frequencies wherein the highest frequency in said third band is approximately equal to the lowest frequency in said first band; and
    means, responsive to the signal provided by said separating means, for developing the control signal for said adaptive filtering means.

2. The apparatus set forth in claim 1 wherein said control signal developing means comprises:
    first means, coupled to said separating means, for developing a unipolar control signal having an instantaneous amplitude that is proportional to the instantaneous magnitude of the signal provided by said separating means.

3. The apparatus set forth in claim 1 wherein said adaptive filtering means comprises:
    a first band-pass filter, coupled to said source, for attenuating the components of said comb filtered chrominance signal which occupy said second band of frequencies relative to the components which occupy said first band of frequencies;
    signal splitting means, coupled to said control signal developing means and to said first filter and having first and second output terminals, said signal splitting means providing signals at its first and second output terminals which are mutually supplementary scaled replicas of the signals provided by said first filter, the amplitudes of said scaled replicas being in a ratio proportional to the instantaneous value of said control signal;
    a second band-pass filter, coupled to the first output terminal of said signal splitting means, for further attenuating the components of said comb filtered chrominance signal occupying the portion of said second band of frequencies which overlaps said first band of frequencies relative to the components occupying the portion of said first band of frequencies which does not overlap said second band of frequencies; and
    signal combining means, coupled to said second filter and to the second output terminal of said signal splitting means, for adding the respective signals provided thereby to produce a filtered output signal.

4. The apparatus set forth in claim 3 wherein said control signal developing means further comprises:
    first means, coupled to said separating means, for developing a unipolar signal having an instantaneous amplitude that is proportional to the instantaneous magnitude of the signal provided by said separating means and
    second means, coupled to said first means, for developing said control signal by attenuating components of the signal provided by said first means which have frequencies greater than the bandwidth of the chrominance signal component of said comb filtered chrominance signal relative to components having frequencies less than the bandwidth of said chrominance signal component.

5. In a video signal processing system including a source of a comb filtered chrominance signal, which includes a chrominance signal component occupying a first band of frequencies, and which includes a first luminance vertical detail signal component occupying a second band of frequencies which is centered about a frequency that is less than the center frequency of said first band of frequencies and which overlaps said first band of frequencies, apparatus comprising:
    an adaptive low-pass filter, coupled to said source, for attenuating the component of said comb filtered chrominance signal occupying said first band of frequencies relative to the component occupying said second band of frequencies and for changing the level of attenuation applied to the component occupying the portion of said first band of frequencies which overlaps said second band of frequencies in response to a first control signal;

means, coupled to said source and to said adaptive low-pass filter, for providing said first control signal having an instantaneous amplitude that is indicative of the magnitude of the chrominance signal component occupying the portion of said first band which overlaps said second band;

an adaptive band-pass filter, coupled to said source, for attenuating the component of the signal provided thereby which occupies said second band of frequencies relative to the component occupying said first band of frequencies and for changing the level of attenuation applied to the component occupying the portion of said second band of frequencies which overlaps said first band of frequencies in response to a second control signal; and means, coupled to said source and to said adaptive band-pass filter, for providing said second control signal having an instantaneous amplitude that is indicative of the magnitude of the luminance signal component occupying the portion of said second band of frequencies which overlaps said first band of frequencies.

6. The apparatus set forth in claim 5 wherein said adaptive band-pass filter comprises:

a first band-pass filter, coupled to said source, for attenuating the components of the signals provided by said source that occupy said second band of frequencies relative to the components which occupy said first band of frequencies;

signal splitting means, coupled to said control signal developing means and to said first filter and having first and second output terminals, said signal splitting means providing signals at its first and second output terminals which are mutually supplementary scaled replicas of the signals provided by said first filter, the respective amplitudes of said scaled replicas being in a ratio proportional to the instantaneous value of said control signal;

a second band-pass filter, coupled to the first output terminal of said signal splitting means, for further attenuating the component of the signals provided thereby which occupies the portion of said second band of frequencies which overlaps said first band of frequencies relative to the component which occupies the portion of said first band of frequencies which does not overlap said second band of frequencies; and signal combining means, coupled to said second filter and to the second output terminal of said signal splitting means, for adding the respective signals provided thereby to produce a filtered output signal.

7. The apparatus set forth in claim 6 wherein the means for developing said second control signal comprises:

a third band-pass filter, coupled to said source, for attenuating components of said comb filtered chrominance signal occupying said first band of frequencies relative to components occupying a third band of frequencies having a bandwidth less than one-half of the bandwidth of said first band of frequencies, and wherein the highest frequency said third band is approximately equal to the lowest frequency in said first band.

8. The apparatus set forth in claim 7 wherein the means for developing said second control signal further comprises:

first means, coupled to said third band-pass filter, for developing a unipolar signal having an instantaneous amplitude that is porportional to the instantaneous magnitude of the signal provided by said third band-pass filter; and second means, coupled to said first means, for developing said second control signal by attenuating components of said unipolar signal which have frequencies greater than the bandwidth of the chrominance signal component of said comb filtered chrominance signal relative to components having frequencies less than the bandwidth of said chrominance signal component.

* * * * *